Aug. 19, 1952     L. F. NICOSIA     2,607,094
ROPE CONNECTOR
Filed Dec. 16, 1950
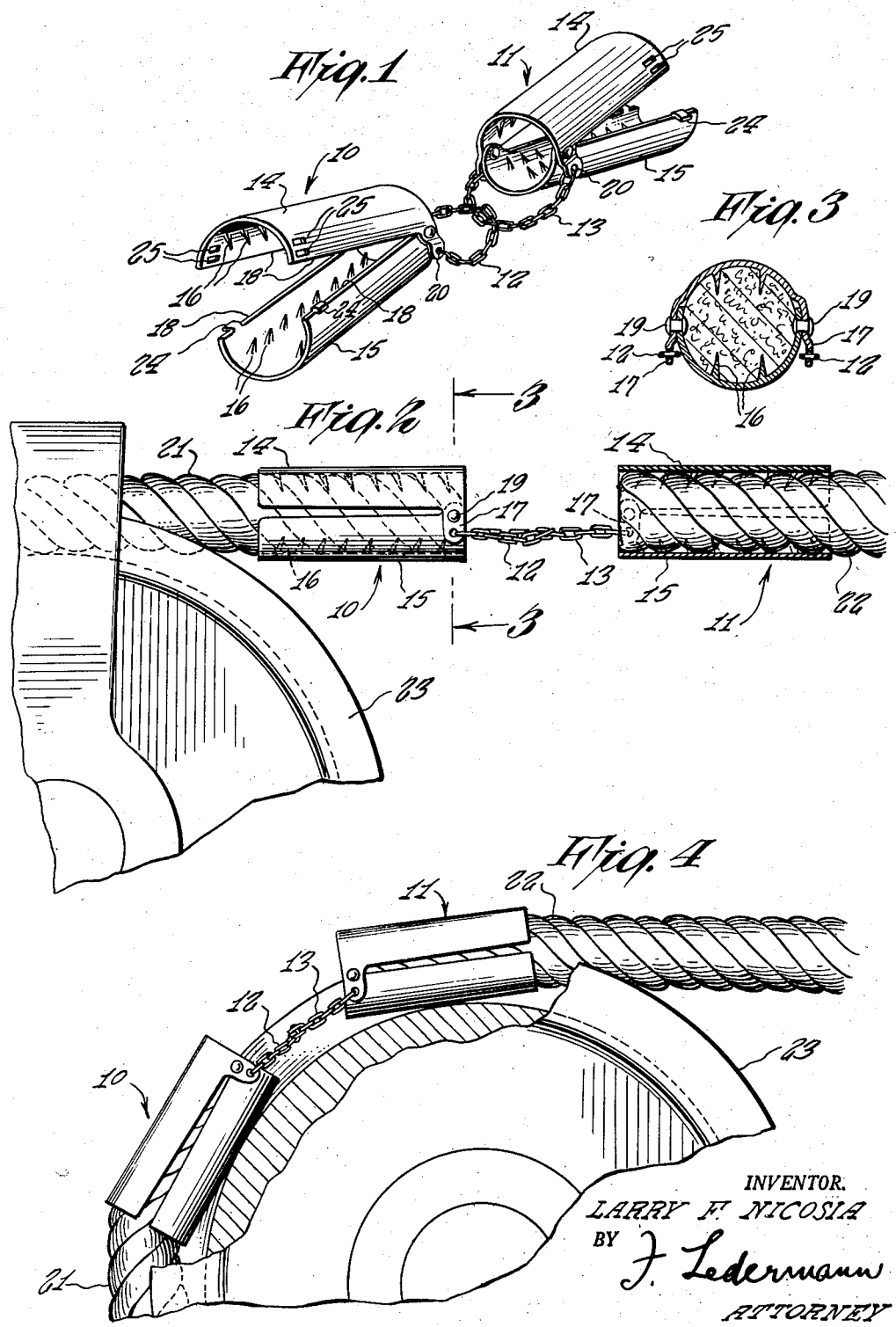
INVENTOR.
LARRY F. NICOSIA
BY
F. Ledermann
ATTORNEY Patented Aug. 19, 1952

2,607,094

UNITED STATES PATENT OFFICE 2,607,094

ROPE CONNECTOR

Larry F. Nicosia, Brooklyn, N. Y.

Application December 16, 1950, Serial No. 201,204

1 Claim. (Cl. 24—123)

This invention relates to connectors for the ends of an endless rope such as used in the case of clothes lines, and the main object is the provision of a novel, useful and improved connector making the same highly practical in the application thereof to join the two ends of a rope to form an endless clothes line.

The above broad as well as additional and more specific objects will be clarified in the following description, wherein characters of reference refer to like-numbered parts in the accompanying drawing. It is to be understood that the drawing is solely for the purpose of illustration, and that it is therefore neither desired nor intended to limit the invention necessarily to any or all of the exact details of construction shown except insofar as they may be deemed essential to the invention.

Referring briefly to the drawing, Fig. 1 is a perspective view of the clothes line connector of this invention, per se.

Fig. 2 is a fragmentary side elevational view of a clothes line pulley having a line including the said connector trained thereabout.

Fig. 3 is a sectional view taken on the line 3—3 of Fig. 2.

Fig. 4 is a view similar to Fig. 2, showing the clothes line so positioned on the pulley that both end members of the connector are in engagement with the pulley.

Referring in detail to the drawing, the numerals 10 and 11 indicate the two end members, and the interengaged chain loops 12 and 13, constituting the connector of this invention. The end members 10 and 11 are identical.

Each member 10 and 11 comprises a pair of opposed complementary semi-cylindrical shells 14 and 15, having a plurality of somewhat rearwardly directed prongs or teeth 16 arranged around the inner surfaces of the shells. The shell 14 is provided with elongations or ears extending divergently and beyond the two straight edges 18 at the rear or hinged end thereof, as shown at 17. The shells 14 and 15 are hinged together at their rear ends by passing a hinge pin 19 through the rear end of the shell adjacent the straight edge 18 thereof and through the ear 17 at a point distant from the extremity of the ear, on both sides of the member 10 or 11. Thus, the greater portion of each ear 17 extends beyond the hinge axis of the pins 19.

Openings 20 are provided through the ears 17 near the extremities thereof. In the openings 20 of the shell 14 of the member 10, the ends of a length of chain 12 are secured, and similarly a second similar length of chain 13 has its ends secured in the openings 20 of the other shell 14. The two chains 12 and 13 are linked together, thereby joining the members 10 and 11 in a universally flexible manner.

When it is desired to connect the two ends 21 and 22 of a rope into an endless clothes line, the connector is applied thereto in the manner illustrated in Figs. 2 and 4. When, for example, the rope end 21 is inserted in the shell 15, with the two shells swung into wide open position, and the two shells are then swung into close proximity with each other, the prongs 16 will dig into the strands of the rope. With the endless line thus formed trained about the pulley 23 and with the line, as is usual, under tension and hence tending to pull the two members 10 and 11 apart, it is apparent that the force of the chains 12 and 13 on the ears 17 of both members will tend to swing the shell 14 into closer or tighter engagement against the rope end. Thus, without the need for any additional securing means the two shells 14 and 15 of each connector member 10 and 11 will remain permanently engaged with their respective rope ends while the line is in position on its pulleys.

Fig. 4 shows how the normal tension on the line maintains this advantageous condition even while the connector is passing around the pulley 23, so that the endless condition of the line will be always maintained.

For use in joining the ends of a rope or ropes which are not normally under tension, auxiliary means may be provided so as to interlock the opposed shells 14 and 15 with the rope end clamped therebetween. Such means is illustrated in Fig. 1, wherein, at or near the forward end of the members 10 and 11, one shell has resilient tongues 24 extending outward from the straight edges thereof and the other shell has complementary slots 25 formed therein. For the purpose of adjusting the members to the thickness of the rope when the rope is relatively thick compared with the normal diameter of the member in closed position, two or more spaced slots 25 may be provided on the shell 14. It is apparent that upon forcing of the two shells together against the rope end, the tongues 24 may be forced into engagement with aligned slots 25 in the shell 14.

Obviously, modifications in form or structure may be made without departing from the spirit or scope of the invention.

I claim:

A connector for joining two flexible members such as, for example, a rope and a chain, comprising a pair of mutually opposed complementary substantially semi-cylindrical shells having a substantially common longitudinal axis, said shells at one end of the connector being hinged together on a common transverse axis, said axes lying in a common imaginary plane, one of said shells at said end thereof having elongated ears extending at right angles to said imaginary plane, said ears having opposed aligned openings therethrough adjacent the extremities thereof, said aligned openings having a common axis parallel to said imaginary plane, said shells having prongs on the inner surfaces thereof, said rope having an end thereof registering between said shells, said chain being looped and having the ends thereof secured in said ear openings whereby, when tension is applied between said rope and said chain, said chain urges said one of said shells toward the other of said shells to tighten said shells against said rope.

LARRY F. NICOSIA.

REFERENCES CITED

The following references are of record in the file of this patent:

UNITED STATES PATENTS

| Number | Name | Date |
| --- | --- | --- |
| 252,502 | Orrick | Jan. 17, 1882 |
| 588,903 | Gillen | Aug. 24, 1897 |
| 1,263,725 | Allmand | Apr. 23, 1918 |
| 1,635,333 | Mickleborough | July 12, 1927 |
| 1,708,470 | Eckert | Apr. 9, 1929 |
| 1,738,331 | Strzyczkowski | Dec. 3, 1929 |
| 1,862,444 | Vickers | June 7, 1932 |
| 2,026,949 | McMahan | Jan. 7, 1936 |

FOREIGN PATENTS

| Number | Country | Date |
| --- | --- | --- |
| 20,699 | Great Britain | Oct. 1, 1898 |